G. TIPPETT.
MEANS TO STOP LEAKS IN PIPES, &c.
APPLICATION FILED JAN. 30, 1915.
1,146,670.
Patented July 13, 1915.
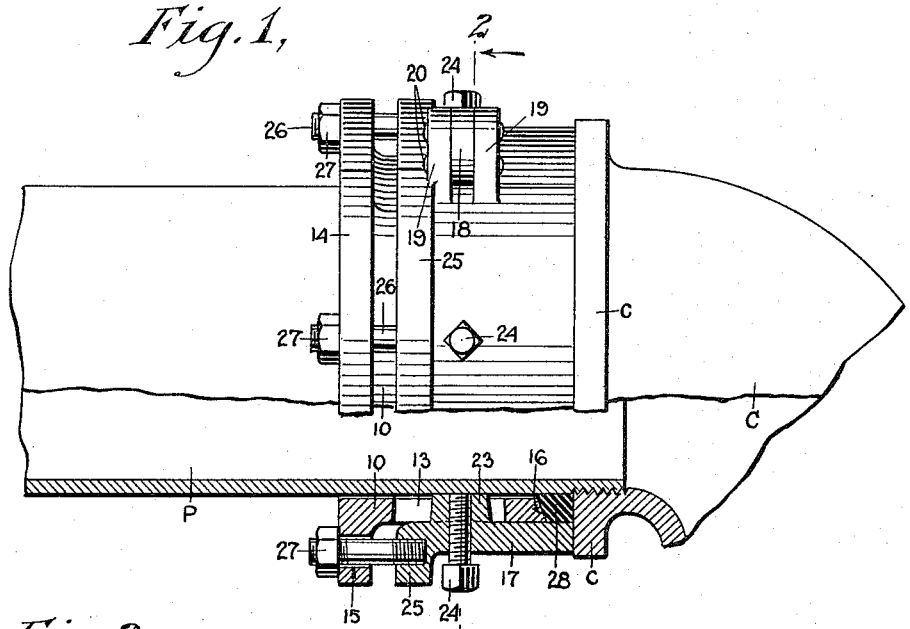
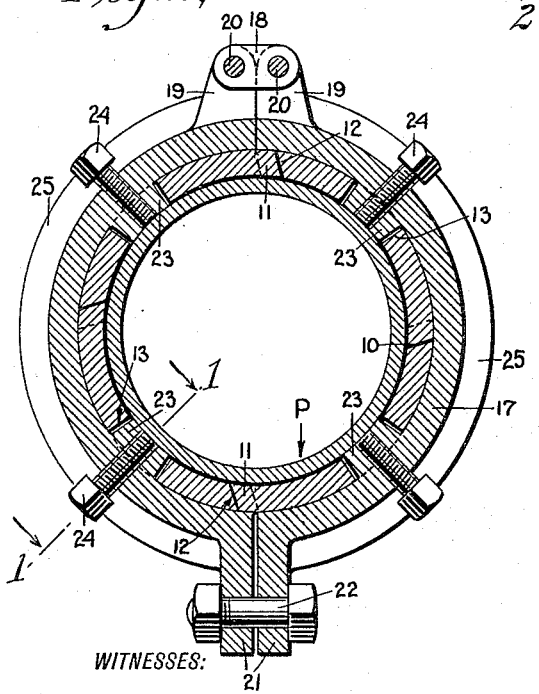
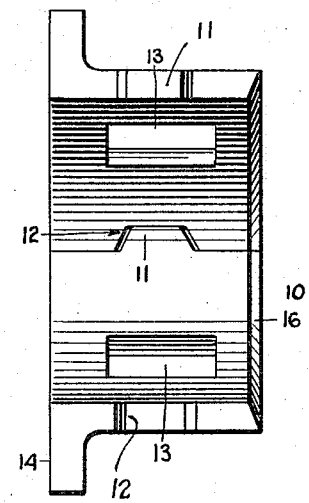
WITNESSES:
Edw. Thorpe
Geo. L. Beeler
INVENTOR
George Tippett
BY Mumm & Co
ATTORNEY

UNITED STATES PATENT OFFICE.

GEORGE TIPPETT, OF NEW YORK, N. Y.

MEANS TO STOP LEAKS IN PIPES, &c.

1,146,670. Specification of Letters Patent. Patented July 13, 1915.

Application filed January 30, 1915. Serial No. 5,233.

*To all whom it may concern:*

Be it known that I, GEORGE TIPPETT, a citizen of the United States, and a resident of the city of New York, Astoria, borough of Queens, in the county of Queens and State of New York, have invented a new and Improved Means to Stop Leaks in Pipes, &c., of which the following is a full, clear, and exact description.

This invention relates to mains and pipes, and has particular reference to devices for stopping leaks in the joints of steam, air, water or other pipe connections.

Among the objects of the invention is to provide a device of the character indicated which is easily applied to a leaky joint and which serves to seal the leak most effectively, means being provided of a peculiar nature whereby, through the loosening of a single bolt nut, the entire device may be slipped from the pipe or fitting after it will have served its purpose in stopping the leak.

Another object of the invention is the provision of a device of the nature indicated which comprises a plurality of parts movable relatively parallel to the axis of the pipe whereby any irregularity in the pipe or coupling construction will not interfere with the action of the device.

The foregoing and other objects of the invention will hereinafter be more fully described and claimed and illustrated in the drawings forming a part of this specification in which like characters of reference indicate coresponding parts in all the views, and in which—

Figure 1 is a longitudinal view, partly in side elevation and partly in section, on the line 1—1 of Fig. 2, of a pipe and elbow joint having my improvement locked thereto for the purpose of stopping a leak at such joint; Fig. 2 is a vertical transverse section on the line 2—2 of Fig. 1; and Fig. 3 is a horizontal longitudinal sectional view of the sleeve portion of the device.

The several parts of this device may be made of any suitable materials, and the relative sizes and proportions, as well as the general design of the mechanism, may be varied to a considerable extent without departing from the spirit of the invention hereinafter more fully described and claimed.

Referring more particularly to the drawings, I show at C a coupling connected to a section of pipe P. These parts may obviously be of any suitable material or size, and as usual the coupling is provided with a rim or flange *c* which surrounds the threaded end *p* of the pipe. It will be understood that the leak stopping device will be made in all standard pipe sizes so as to be applied around the pipe adjacent said flange *c*.

My device comprises but two principal members together with connecting and locking devices. The member 10 is a sleeve split longitudinally into any suitable number of parts or segments, provided with interengaging or interlocking lugs 11 and notches or recesses 12. These lugs and notches are provided with flaring end walls for facilitating the assemblage of the parts, but I prefer to provide a slight looseness between each lug and its notch whereby one of the segments of the sleeve may move longitudinally of the other or others during the practical operation of the device to accommodate the packing devices to any irregularities or imperfections which may exist in the pipe or coupling members. Each of the sleeve segments is provided with one or more open slots 13 shown herein as substantially rectangular and with their longer axes parallel to the axis of the sleeve or pipe. According to the illustration herewith, each of the sleeve segments is provided with one of such slots, but obviously this number may be greater or less according to the diameter of the pipe being treated or according to any other condition which may modify this phase of the invention. One end of the sleeve is provided with an outwardly projecting flange 14 or its equivalent, and this flange is provided with any suitable number of holes 15 formed therethrough parallel to the axis of the pipe. The other end of the sleeve is slightly conical and outwardly flared as shown at 16.

The other main part of the device is a collar 17 split longitudinally into any suitable number of parts, shown herein as two. These two parts are permanently connected on one side of the pipe by a double hinge device including a link 18 extending between pairs of parallel lugs 19 and having pivot pins 20 securing the link permanently to the lugs. At the other side of the pipe the collar members are provided with a pair of oppositely arranged lugs 21 through which a heavy clamping bolt 22 passes.

The line or plane of connection between the two collar parts corresponds substantially with the lines of connection between the sleeve parts, and hence the two sets of gland members may be applied to or removed from the pipe simultaneously. The collar is provided with a series of lugs 23 projecting inwardly therefrom radially and into the aforesaid slots 13 of the sleeve. These lugs 23 may be either rectangular or round in face view, and hence are shorter longitudinally of the pipe than the slots 13, allowing considerable amount of longitudinal movement of the sleeve with respect to the collar. Each of the lugs 23 and the body of the collar adjacent thereto are tapped to receive a set screw 24 adapted to be turned inwardly snugly against the pipe, locking the collar with one end thereof snugly against the face of the flange c of the coupling. These set screws 24, together with the clamping action of the bolt 22, lock the collar rigidly in the position just described.

The collar at the end opposite the flange c is provided with an outwardly projecting flange 25 of preferably the same diameter and nature as the aforesaid sleeve flange 14 from which it is spaced a considerable distance. A series of tap bolts 26 are fixed in the flange 25 and extend thence outwardly parallel to the axis of the pipe through the aforesaid sleeve flange holes 15. These tap bolts have nuts 27 fitted thereto on the outer face of the sleeve flange.

At 28 I show a compressible packing member or gasket in the form of a ring which may be cut or split at one side to allow it to pass over the pipe. This gasket may be made of soft rubber or any other plastic or semi-plastic composition adapting it to be forced at least at one edge well into the joint between the coupling and pipe. This gasket is applied around the pipe adjacent the joint and then the gland members 10 and 17 are applied around the pipe snugly embracing the gasket and with the collar 17 abutting as firmly against the flange c of the coupling as possible. The bolt 22 is then tightened, holding all of the parts detachably together and with the collar locked in the position where it will be finally locked by the application or force applied through a wrench or the like to the set screws 24. The collar thus becomes an anchor member serving not only to confine the gasket from spreading outwardly radially, but also constitutes an anchor whereby the action of the nuts 27 acting inwardly along the bolts 26 serves positively and forcibly to squeeze the sleeve as a plunger inwardly against the gasket, which action of the sleeve, together with the conical or flaring shape of its inner edge or end, serves to force the plastic gasket well into the joint between the coupling and the pipe. The extent to which this squeezing of the gasket into the joint takes place will depend upon the nature of the plastic material and the size or shape of the opening at the joint through which the leak occurs.

In the usual practice of this invention, I have found by experience that for the curing of an ordinary leak in a steam or water pipe, the application of the gland members above described to the faulty joint will permanently cure the leak in from one to four days for the reason that when the outflow of water or steam through the joint is stopped, the opening, either by the natural oxidation of the joint with the accompanying deposit therefrom, or the same in connection with the introduced plastic gasket structure, becomes so thoroughly sealed or plugged, the attachment on the outside of the pipe will no longer be required. Hence the device may be removed from the pipe for use elsewhere as occasion may require. It will be observed that for this purpose the loosening of the bolt 22 alone will suffice to release the entire gland from the pipe, and after the device is so released the set screws 24 may easily be run outwardly with respect to the collar members without resistance, ready for a subsequent application of the device to a leaky joint.

I claim:

1. In a device of the character set forth, the combination of a sleeve split longitudinally into a plurality of segments, each segment having a slot formed therethrough and extending longitudinally of the axis of the sleeve, a collar surrounding the sleeve and having a plurality of lugs extending radially inwardly through said slots, said lugs being spaced from the ends of the slots and one end of the collar projecting over and beyond the adjacent end of the sleeve, and means acting between the sleeve and the collar serving to force the sleeve longitudinally of the collar and causing said sleeve end to approach the plane of said end of the collar.

2. In a device of the character set forth, the combination of a sleeve split longitudinally into a plurality of segments, each segment having a slot formed therethrough and extending longitudinally of the axis of the sleeve and also having an outwardly projecting flange provided with a hole formed in the direction of the axis aforesaid, a collar surrounding the sleeve and having a plurality of lugs extending loosely through said slots spaced from the ends of the slots, means acting upon the collar serving to lock it in fixed position, and means extending from the collar through said sleeve flange holes serving to force the sleeve longitudinally of said collar and its inwardly projecting lugs, substantially as set forth.

In testimony whereof I have signed my name to this specification in the presence of two subscribing witnesses.

GEORGE TIPPETT.

Witnesses:
 VALENTINE R. BUSH,
 W. T. ANDARÏESE.

Copies of this patent may be obtained for five cents each, by addressing the "Commissioner of Patents, Washington, D. C."